United States Patent
Mondal

(10) Patent No.: US 11,699,435 B2
(45) Date of Patent: Jul. 11, 2023

(54) SYSTEM AND METHOD TO INTERPRET NATURAL LANGUAGE REQUESTS AND HANDLE NATURAL LANGUAGE RESPONSES IN CONVERSATION

(71) Applicant: Wizergos Software Solutions Private Limited, Bangalore (IN)

(72) Inventor: Shibabrata Mondal, Bangalore (IN)

(73) Assignee: Wizergos Software Solutions Private Limited

(*) Notice: Subject to any disclaimer, the term of this patent is extended or adjusted under 35 U.S.C. 154(b) by 14 days.

(21) Appl. No.: 16/706,902

(22) Filed: Dec. 9, 2019

(65) Prior Publication Data

US 2021/0082422 A1    Mar. 18, 2021

(30) Foreign Application Priority Data

Sep. 18, 2019    (IN) .............................. 201941037543

(51) Int. Cl.
*G10L 15/22*    (2006.01)
*G10L 15/18*    (2013.01)
(Continued)

(52) U.S. Cl.
CPC ............ *G10L 15/22* (2013.01); *G10L 15/183* (2013.01); *G10L 15/1815* (2013.01);
(Continued)

(58) Field of Classification Search
None
See application file for complete search history.

(56) References Cited

U.S. PATENT DOCUMENTS 8,924,410 B2    12/2014  Bierner
9,922,642 B2 *   3/2018  Pitschel ................ G10L 15/063
(Continued)

FOREIGN PATENT DOCUMENTS

EP       2084619 A2    8/2009
WO    2019088638 A1    5/2019

OTHER PUBLICATIONS

Angel Castellanos Gonzalez, Sorry 1 didn't get that!—How to understand what your users want, Using unsupervised AI to automate the definition of your chatbot, https://building.lang.ai/.

*Primary Examiner* — Richard Z Zhu
(74) *Attorney, Agent, or Firm* — Jason C. Cameron

(57) ABSTRACT

A system and method to interpret natural language requests and handle natural language responses in conversation is disclosed. The system includes an intent creation subsystem to receive one or more predefined intents to create one or more corresponding intent databases; a natural language message handling subsystem to receive a plurality of natural language messages from a user to identify one or more intents, to match one or more identified intents associated with the plurality of received natural language messages with the one or more predefined intents, handle the one or more identified intents by using a first message handling scheme when a similar match is found and a second message handling scheme in case of a dissimilar match; a natural language response handling subsystem to extract information from plurality of received natural language messages, to rectify the plurality of received natural language messages to handle a structured natural language response.

7 Claims, 7 Drawing Sheets

(51) Int. Cl.
  *G10L 15/183*  (2013.01)
  *G06F 40/56*   (2020.01)
  *G06F 40/35*   (2020.01)
  *G06F 40/30*   (2020.01)

(52) U.S. Cl.
  CPC .......... *G10L 15/1822* (2013.01); *G06F 40/30* (2020.01); *G06F 40/35* (2020.01); *G06F 40/56* (2020.01); *G10L 2015/223* (2013.01); *G10L 2015/226* (2013.01)

(56) References Cited

U.S. PATENT DOCUMENTS

| | | | |
|---|---|---|---|
| 10,176,167 B2* | 1/2019 | Evermann | G06F 40/35 |
| 2005/0105712 A1* | 5/2005 | Williams | G10L 13/027 |
| | | | 704/275 |
| 2014/0244266 A1* | 8/2014 | Brown | G06F 3/167 |
| | | | 715/764 |
| 2015/0039292 A1* | 2/2015 | Suleman | G06F 16/285 |
| | | | 704/9 |
| 2015/0304492 A1* | 10/2015 | Eyeson | H04M 3/5175 |
| | | | 379/265.1 |
| 2018/0246877 A1 | 8/2018 | Vainas et al. | |
| 2018/0307675 A1* | 10/2018 | Akkiraju | G06N 20/00 |
| 2019/0279106 A1* | 9/2019 | Yadav | G06F 3/167 |
| 2019/0349320 A1* | 11/2019 | Karuppusamy | G06Q 10/107 |
| 2019/0370669 A1* | 12/2019 | Pais | G06F 16/90335 |
| 2020/0184383 A1* | 6/2020 | Mehta | G06N 3/04 |
| 2021/0043200 A1* | 2/2021 | Goncalves Jordao | |
| | | | G06F 16/635 |
| 2021/0065203 A1* | 3/2021 | Billigmeier | G06N 20/00 |

* cited by examiner

SYSTEM AND METHOD TO INTERPRET NATURAL LANGUAGE REQUESTS AND HANDLE NATURAL LANGUAGE RESPONSES IN CONVERSATION

This US application claims priority from a complete patent application filed in India having Patent Application No. 201941037543, filed on Sep. 18, 2019 titled "SYSTEM AND METHOD TO INTERPRET NATURAL LANGUAGE REQUESTS AND HANDLE NATURAL LANGUAGE RESPONSES IN CONVERSATION"

BACKGROUND

Embodiments of the present disclosure relates to an interactive system and more particularly to a system and a method to interpret natural language requests and handle natural language responses in a conversation.

A machine-driven information retrieval system for information search or for providing an end-user service is utilised in one or more areas. The machine-driven information retrieval system used in the one or more areas includes but not limited to online consulting centres, online shopping malls, online ticket-reservation systems, online education systems, hospital management systems and the like. Generally, the machine-driven information retrieval system includes an interactive agent which understands one or more user requests and provides one or more responses upon understanding. But, sometimes, the interactive agent provides one or more irrelevant responses which further fails in locating a precise information sought in the one or more requests. Various such machine-driven information retrieval systems are available which interprets the one or more user requests with a help of the interactive agent and provides the one or more relevant responses to the one or more requests based on an interpretation.

Conventionally, the machine-driven information retrieval systems available interprets one or more structured incoming user requests of a natural language. However, such conventional systems are unable to handle one or more unstructured incoming user requests or to provide one or more structured responses. Also, such conventional systems are static and incapable of upgrading a backend technology involved with the system in order to modify or auto-correct the one or more responses generated for the one or more user requests. Moreover, such systems are configured to interpret the one or more incoming user requests in a limited number of languages.

Hence, there is a need for an improved system and a method to interpret and handle natural language requests and handle natural language responses in a conversation in order to address the aforementioned issues.

BRIEF DESCRIPTION

In accordance with an embodiment of the present disclosure, a system to interpret natural language requests and handle natural language responses in a conversation is disclosed. The system includes an intent creation subsystem configured to receive one or more predefined intents to create one or more corresponding intent databases. The system also includes a natural language message handling subsystem operatively coupled to the intent creation subsystem. The natural language message handling subsystem is configured to receive a plurality of natural language messages from a user to identify one or more intents associated with a plurality of received natural language messages. The natural language message handling subsystem is also configured to match one or more identified intents associated with the plurality of received natural language messages with the one or more predefined intents. The natural language message handling subsystem is also configured to handle the one or more identified intents by using a first message handling scheme when the one or more identified intents matches with the one or more predefined intents. The natural language message handling subsystem is also configured to handle the one or more identified intents by using a second message handling scheme when the one or more identified intents are unmatched with the one or more predefined intents. The system also includes a natural language response handling subsystem operatively coupled to the natural language message handling subsystem. The natural language response handling subsystem is configured to extract information from the plurality of received natural language messages, upon handling of the one or more identified intents, based on an information type and a validation criteria. The natural language response handling subsystem is also configured to rectify the plurality of received natural language messages to handle a structured natural language response when an extraction of the information fails.

In accordance with another embodiment of the present disclosure, a method to interpret natural language requests and handle natural language responses in a conversation is disclosed. The method includes receiving, by an intent creation subsystem, one or more predefined intents to create one or more corresponding intent databases. The method also includes receiving, by a natural language message handling subsystem, a plurality of natural language messages from a user to identify one or more intents associated with a plurality of received natural language messages. The method also includes matching, by a natural language message handling subsystem, one or more identified intents associated with the plurality of received natural language messages with the one or more predefined intents. The method also includes handling, by the natural language message handling subsystem, the one or more identified intents by using a first message handling scheme when the one or more identified intents matches with the one or more predefined intents. The method also includes handling, by the natural language message handling subsystem, the one or more identified intents by using a second message handling scheme when the one or more identified intents are unmatched with the one or more predefined intents. The method also includes extracting, by a natural language response handling subsystem, information from the plurality of received natural language messages, upon handling of the one or more identified intents, based on an information type and a validation criteria. The method also includes rectifying, by the natural language response handling subsystem, the plurality of received natural language messages to handle a structured natural language response when an extraction of the information fails.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 6 (b) is a flow chart representing the continued steps of FIG. 6 (a) involved in a method to interpret natural language requests and handle natural language responses in a conversation in accordance with the embodiment of the present disclosure.

Figure 1:
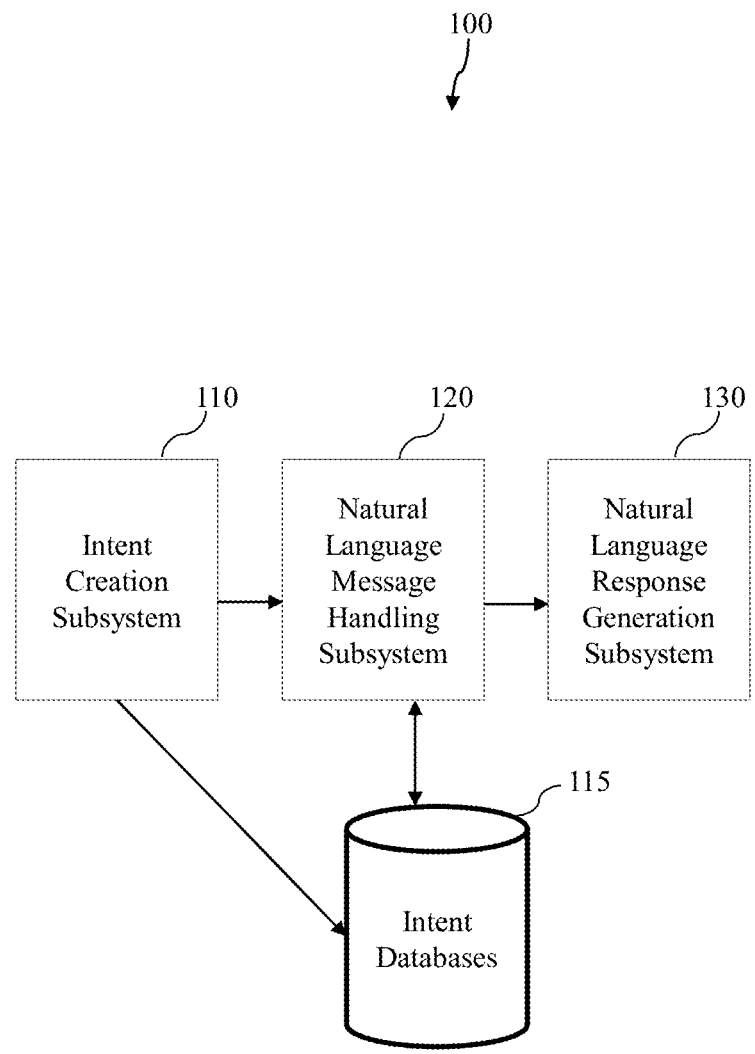
FIG. 1 is a block diagram of a system to interpret natural language requests and handle natural language responses in a conversation in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method to interpret natural language requests and handle natural language responses in a conversation. The system includes an intent creation subsystem configured to receive one or more predefined intents to create one or more corresponding intent databases. The system also includes a natural language message handling subsystem operatively coupled to the intent creation subsystem. The natural language message handling subsystem is configured to receive a plurality of natural language messages from a user to identify one or more intents associated with a plurality of received natural language messages. The natural language message handling subsystem is also configured to match one or more identified intents associated with the plurality of received natural language messages with the one or more predefined intents. The natural language message handling subsystem is also configured to handle the one or more identified intents by using a first message handling scheme when the one or more identified intents matches with the one or more predefined intents. The natural language message handling subsystem is also configured to handle the one or more identified intents by using a second message handling scheme when the one or more identified intents are unmatched with the one or more predefined intents. The system also includes a natural language response handling subsystem operatively coupled to the natural language message handling subsystem. The natural language response handling subsystem is configured to extract information from the plurality of received natural language messages, upon handling of the one or more identified intents, based on an information type and a validation criteria. The natural language response handling subsystem is also configured to rectify the plurality of received natural language messages to handle a structured natural language response when an extraction of the information fails.

FIG. 1 is a block diagram of a system 100 to interpret natural language requests and handle natural language responses in a conversation in accordance with an embodiment of the present disclosure. The system 100 includes an intent creation subsystem 110 which is configured to receive one or more predefined intents to create one or more corresponding intent databases 115. As used herein, the term 'one or more predefined intents' are defined as one or more possible natural language texts which are created or edited manually based on requirement. In one embodiment, the corresponding one or more intent databases 115 may include at least one of an indexed intent database, a quick normalised intent database, an advanced normalised intent database, a vector representation of intent database, nearest neighbour vector indices database or a combination thereof. In such embodiment, the indexed intent database may include the one or more predefined intents with a ranking capability. In another embodiment, the quick normalised intent database may include the one or more predefined intents which are stored upon normalisation by conversion of one or more lowercase user intents to one or more uppercase user intents or vice-versa, normalisation by removing one or more punctuation marks, whitespaces from the one or more user intents. In yet another embodiment, the advanced normalised intent database may include the one or more predefined intents which are stored upon normalisation by removing one or more repetitive articles which does not impact meaning of the one or more predefined intents or converting a text into a canonical form. In one embodiment, the vector representation of intent database may include storage of the one or more predefined intents, wherein the one or more predefined intents are formed upon conversion of a text format of the one or more user intents into a multidimensional numerical format of the one or more user intents. In another embodiment, the nearest neighbour vector indices database may include one or more indices or one or more positions corresponding to one or more elements of the vector.

The system 100 also includes a natural language message handling subsystem 120 operatively coupled to the intent creation subsystem 110. The natural language message handling subsystem 120 is configured to receive a plurality of natural language messages from a user to identify one or more intents associated with a plurality of received natural language messages. The term 'natural language messages' is defined as messages which are received in human spoken languages. In one embodiment, the plurality of natural language messages may include at least one of a natural language user request, a natural language user response or a combination thereof. In such embodiment, the natural language user request may include at least one of a query, a demand, a command or a combination thereof. In one embodiment, the natural language user response may include a reply, or an answer given by the user.

In a specific embodiment, the system 100 further includes an intent analysis subsystem operatively coupled to the intent creation subsystem 110. In such embodiment, the intent analysis subsystem is configured to recognise a language of the one or more predefined intents by using a linguistic analysis technique. As used herein, the term 'linguistic analysis technique' is defined as a technique which is used by a machine to understand and analyse the text for extracting meaning from the text. The intent analysis subsystem is also configured to categorise one or more analysed intents into the one or more corresponding intent databases based on one or more criteria by using one or more classifiers. In one embodiment, the one or more classifiers may include a supervised learning machine (SVM), a convolutional neural network (CNN), a naïve Bayes classifier or a combination thereof.

The natural language message handling 120 subsystem is also configured to match one or more identified intents associated with the plurality of received natural language messages with the one or more predefined intents. As used herein, the term 'one or more identified intents' are defined as one or more intents which are extracted and identified from the plurality of received natural language messages. In one embodiment, the natural language response may include at least one of a state of the user, a location of the user, a time of the user, a purpose of the user or a combination thereof.

Figure 2:
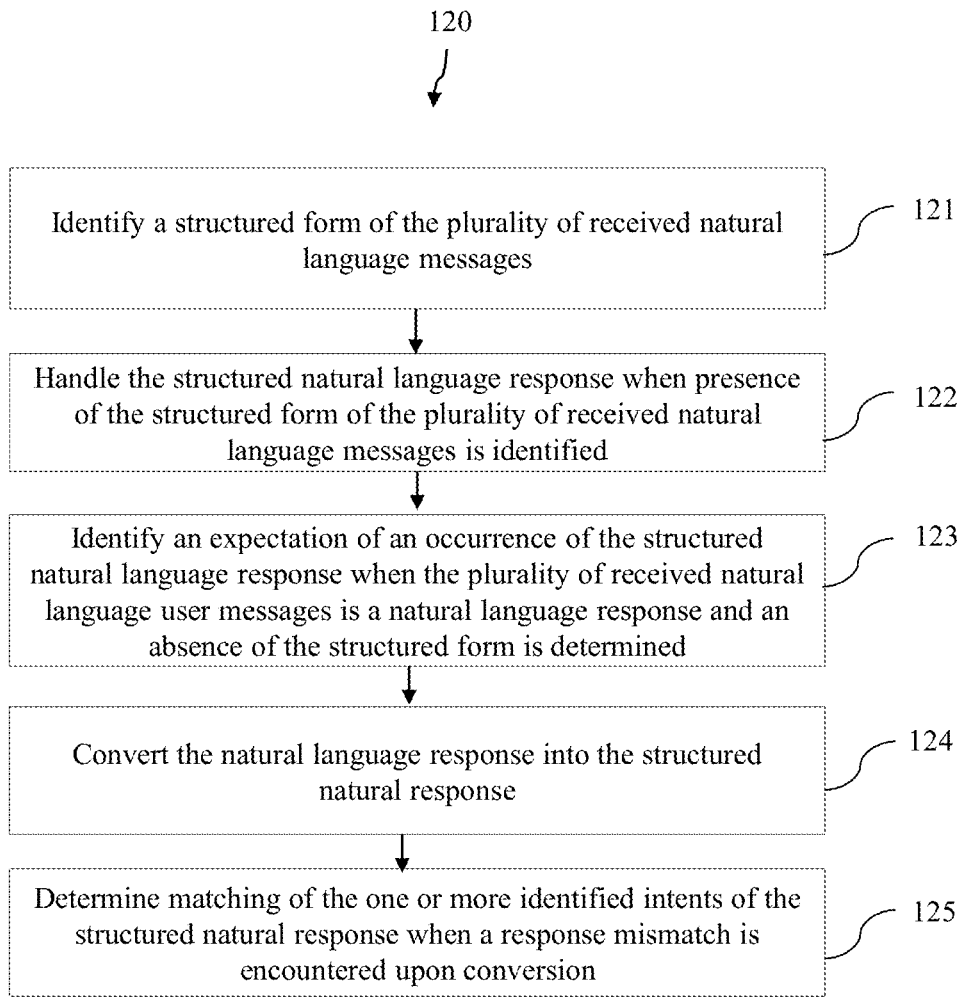
FIG. 2 is a flowchart representing the steps involved in a method for depicting a first message handling scheme of a system to interpret natural language requests and handle natural language responses in a conversation of FIG. 1 in accordance with an embodiment of the present disclosure.

The natural language message handling subsystem 120 is also configured to handle the one or more identified intents by using a first message handling scheme when the one or more identified intents matches with the one or more predefined intents. The first message handling scheme is computationally faster and involves computation of one or more tasks which are simpler, wherein the one or more tasks may include matching the one or more identified intents with the one or more predefined intents. The detailed description of the natural language message handling subsystem is shown in FIG. 2. FIG. 2 depicts a flowchart representing the steps involved in a method for depicting first message handling scheme of a system 100 to interpret natural language requests and handle natural language responses in a conversation in accordance with an embodiment of the present disclosure.

In one embodiment, the first message handling scheme may include a fast path processing technique. In such embodiment, the first message handling scheme at first identifies a structured form of the plurality of received natural language messages in step 121. The first message handling scheme also handles the structured natural language response when presence of the structured form of the plurality of received natural language messages is identified in step 122. The first message handling scheme upon identification of the expectation of the occurrence of the structured natural language response language response when the plurality of received natural language user messages is a natural language response and an absence of the structured form is determined in step 123. The first message handling scheme also converts the natural language response into the structured natural response in step 124. The first message handling scheme also determines matching of the one or more identified intents of the structured natural response when a response mismatch is encountered upon conversion in step 125.

Figure 3:
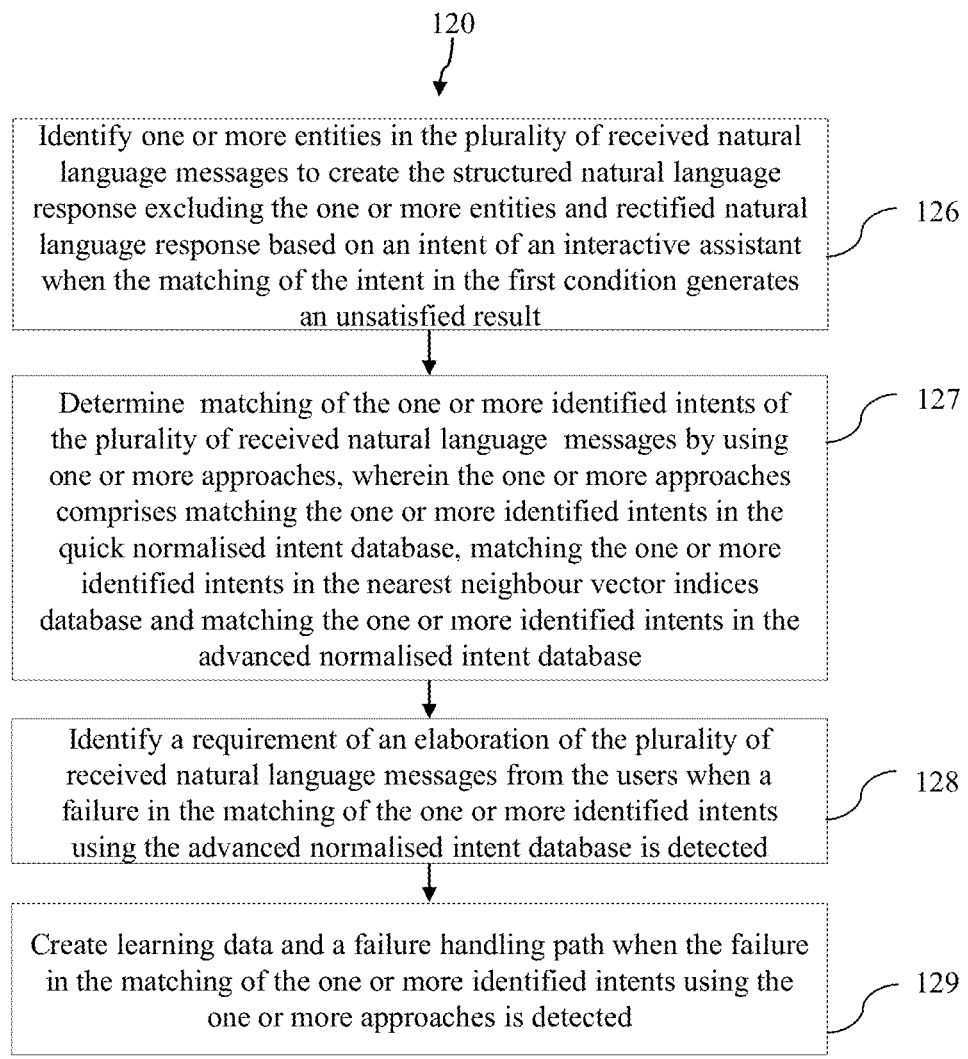
FIG. 3 is a flowchart representing the steps involved in a method for depicting a second message handling scheme of a system to interpret natural language requests and handle natural language responses in a conversation of FIG. 1 in accordance with an embodiment of the present disclosure.

Referring to FIG. 1, the natural language message handling subsystem 120 is also configured to handle the one or more identified intents by using a second message handling scheme when the one or more identified intents are unmatched with the one or more predefined intents. The second message handling scheme involves computation of one or more complicated tasks, wherein an advanced level of intent matching is performed. The detailed explanation of the second message handling scheme is represented in FIG. 3. FIG. 3 depicts a flowchart representing the steps involved in a method for depicting a second message handling scheme of a system 100 to interpret natural language requests and handle natural language responses in a conversation in accordance with an embodiment of the present disclosure.

In one embodiment, the second message handling scheme may include a slow path processing technique. The second message handling scheme identifies one or more entities in the plurality of received natural language messages to create the structured natural language response excluding the one or more entities and rectified natural language response based on an intent of an interactive assistant when the matching of the intent in the first condition generates an unsatisfied result in step 126. As used herein, the term 'one or more entities' are defined as a term or object that is relevant to your intents and that provides a specific context for an intent. In one embodiment, the one or more entities may include a noun or a pronoun or a combination thereof.

Upon identification of the one or more entities, the second message handling scheme determines matching of the one or more identified intents of the plurality of received natural language messages by using one or more approaches, wherein the one or more approaches includes matching the one or more identified intents in the quick normalised intent database, matching the one or more identified intents in the nearest neighbour vector indices database and matching the one or more identified intents in the advanced normalised intent database in step 127. The second message handling scheme also identifies a requirement of an elaboration of the plurality of received natural language messages from the users when a failure in the matching of the one or more identified intents using the advanced normalised intent database is detected in step 128. Also, the second message handling scheme creates learning data and a failure handling path when the failure in the matching of the one or more identified intents using the one or more approaches is detected in step 129.

Referring back to FIG. 1, the system 100 also includes a natural language response handling subsystem 130 operatively coupled to the natural language message handling subsystem 120. The natural language response handling subsystem 130 is configured to extract information from the plurality of received natural language messages, upon handling of the one or more identified intents, based on an information type and a validation criteria. The interactive assistant upon matching the one or more identified intents extracts the information to generate a natural language response. In one embodiment, the information type may include a phone number of the user, a name of the user, an email-id of the user, an address of the user or a combination thereof. In some embodiment, the validation criteria may include a set of predetermined rules corresponding to each of the information type.

The natural language response handling subsystem 130 is also configured to rectify the plurality of received natural language messages when an extraction of the information fails. The natural language response handling subsystem 130 also enables the interactive learning assistant to automatically correct an incorrect natural language message received from the user. The natural language response handling subsystem 130 rectifies the plurality of received natural language messages based on the information type and the validation criteria. Upon successful rectification, further plurality of rectified messages are updated in a database.

In one embodiment, the system 100 also includes an intent match post-processing subsystem (not shown in FIG. 1) operatively coupled to the natural language response handling subsystem 130. The intent match post-processing subsystem is configured to generate a structured natural language response upon selection of the plurality of received natural language messages based on a personalisation criteria. The structured natural language response is generated based on an execution of a dynamically generated working procedure when a successful intent match is encountered. In one embodiment, the personalisation criteria may include one or more standards which differs depending upon at least one of the location of the user, a choice of the user, a personality of the user and the like.

In a specific embodiment, the system 100 further includes a learning and augmentation subsystem operatively coupled to the natural language message handling subsystem 120, the natural language response generation subsystem 130 and the intent match post-processing subsystem 140. The learning and augmentation subsystem is configured to enable the interactive assistant to augment an implementation of a conversational functionality to attain a predetermined performance level in the conversation. In one embodiment, the learning and the augmentation subsystem utilises an artificial intelligence technique to optimise the performance of the interactive assistant. The interactive assistant learns from historical data and improves the performance in order to provide accurate and fast results for future data.

In a preferred embodiment, the system 100 further includes a recommendation subsystem operatively coupled to the learning and augmentation subsystem. The recommendation subsystem is configured to provide one or more real-time recommendations to at least one administrator associated with monitoring activity of the conversation process, wherein the at least one administrator includes the interactive assistant associated with the conversation, a human assistant associated with the conversation or a combination thereof.

Figure 4:
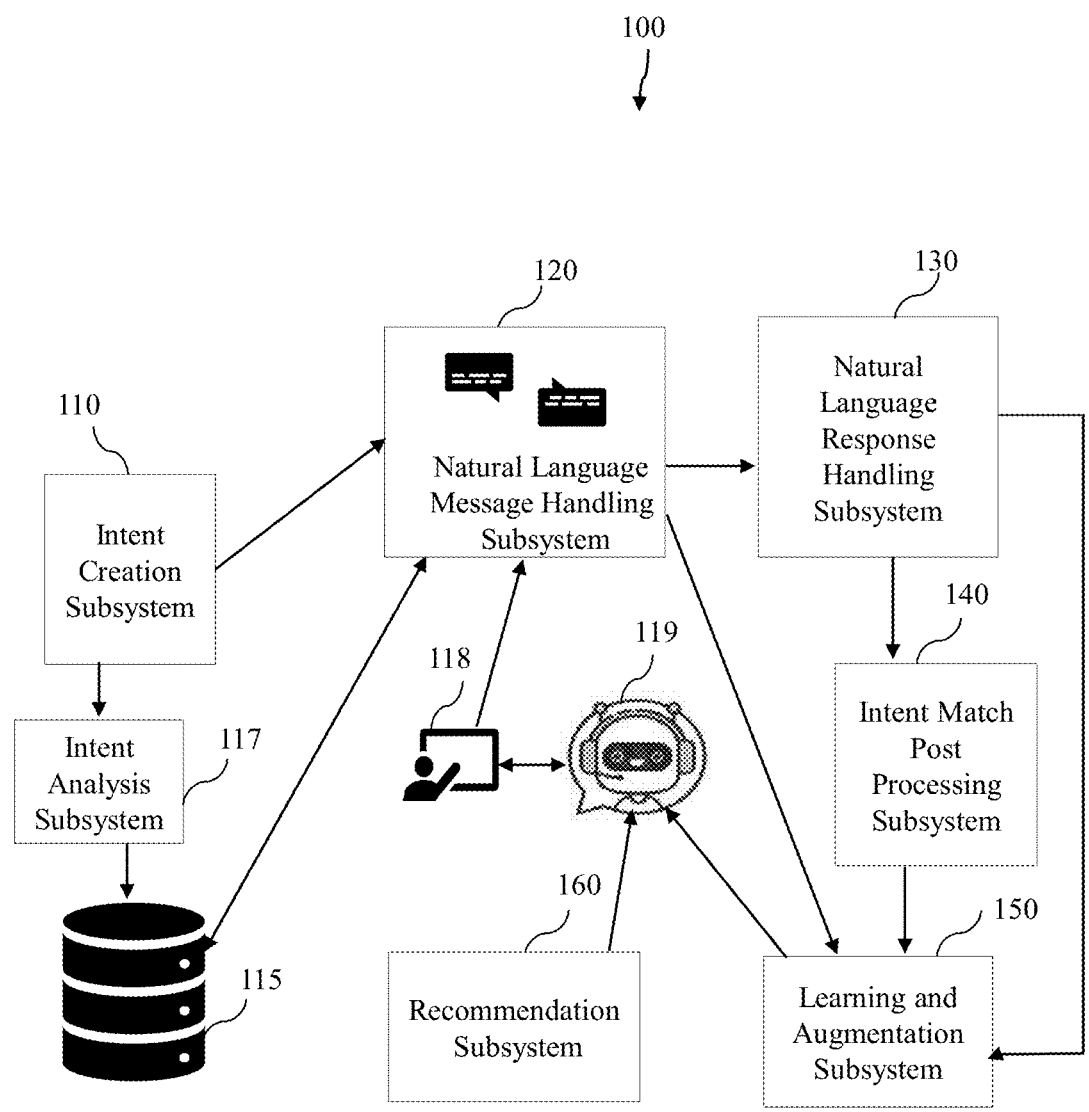
FIG. 4 is a schematic representation of an exemplary embodiment of a system to interpret natural language requests and handle natural language responses in a conversation in accordance with the embodiment of the present disclosure.

FIG. 4 is a schematic representation of an exemplary embodiment of a system 100 to interpret natural language requests and handle natural language responses in a conversation in accordance with the embodiment of the present disclosure. The system 100 to interpret natural language requests and handle natural language responses is utilised for implementation of a chatbot, a conversational user interface, an interactive assistant and the like. For example, the system 100 may be utilised by a company for implementing the chatbot in order to perform one or more functions. Let us assume that the system 100 is utilised by an insurance company 'A' to handle the conversation with their customers. Now, for implementation of such a system 100, at first creation of one or more predefined intents are essential. The one or more predefined intents are created by visualising one or more possibilities which may encounter in future. The one or more predefined intents are created and edited by a supervisor associated with the chatbot. Here, the one or more predefined intents are processed to create one or more corresponding intent databases 115 to assist in the high-speed user intent matching in real time. Each of these intent-based data structures or one or more corresponding intent databases 115 are separated virtually or physically for each separate chatbot. For example, the one or more intent databases 115 may include at least one of an indexed intent database, a quick normalised intent database, an advanced normalised intent database, a vector representation of intent database, nearest neighbour vector indices database or a combination thereof. Also, before creation of the one or more intent databases 115, a language analysis of one or more predefined intents are performed by using an intent analysis subsystem 117.

The creation of the one or more intent databases 115 becomes helpful, when an incoming natural language is received from a user 118. For example, if the user 118 starts the conversation with an interactive assistant 119 of the chatbot, by sending the natural language message, then for sending a structured response by the interactive assistant 119 corresponding to the natural language response, the interactive assistant 119 may refer the one or more intent databases 115. So, whenever the natural language message arrives from the user 118 in natural language text, it is looked up in the one or more intent databases 115 quickly to find a fastest or an accurate match. In the one or more intent databases 115, the one or more predefined intents are stored upon text normalisation. For example, in a quick normalised intent database, the one or more predefined intents are stored upon normalisation of the natural language message by converting one or more lowercase user intents to one or more uppercase user intents or vice-versa, removing one or more punctuation marks and whitespaces from the one or more user intents.

Similarly, an advanced normalised intent database may store the one or more predefined intents when the natural language message is normalised by removing one or more repetitive articles which does not impact meaning of the one or more predefined intents or converting a word of the natural language message into a canonical form. Here, the canonical form of the word may include a root form of the word with several synonyms. For example, the one or more repetitive articles may include 'a', 'an', 'is, 'are' and the like. Again, the vector representation of intent database may include storage of the one or more predefined intents, wherein the one or more predefined intents are formed upon conversion of a text format of the received natural language message into a multidimensional numerical format of the natural language message. So, a distance is computed by representing one or more sentences of the natural language message into a form of a vector or a point. Now, two sentences are similar if the distance computed between two points is small.

The system 100 also includes a natural language message handling subsystem 130 to match one or more identified intents associated with the plurality of received natural language messages with the one or more predefined intents. So, here, the matching is performed by using several schemes. For example, if one or more intents of the natural language message which is received from the user 118 matches with the one or more predefined intents, then the first message handling scheme is used for processing. Let's assume, that a natural language request asked by the user 118, is 'when is my insurance next premium due date?' Now, for such request, the natural language response handling subsystem 120 enables the interactive assistant 119 to search if such similar intent is available in the one or more intent databases 115. Suppose, the interactive assistant 119 finds that 'please remind my insurance premium date to be paid next' which is somewhat similar to the one or more identified intents, then the interactive assistant 119 utilises the fast path processing to generate response. Again, if the intent match is not found similar, upon matching the one or more identified intents with the one or more predefined intents, then a second message handling scheme which is also known as the slow path processing technique is utilised.

Once, the intent match is identified, the natural language response is generated by a natural language response handling subsystem 130. Here, the natural language response handling subsystem 130 extracts information from the plurality of received natural language messages, upon handling of the one or more identified intents, based on an information type and a validation criteria. For example, the information type may include a phone number of the user, a name of the user, an email-id of the user, an address of the user or a combination thereof. The information type is extracted from the natural language which is received from the user 118. Suppose, with the continued reference from the ongoing conversation between the user and the interactive assistant 119 of the chatbot, if the user 118 responds that the 'registered phone number associated with the insurance policy is +91-9080123456' and 'the name of the insurance policy holder is Mr. X'. Then, the natural language response handling subsystem 130 enables the interactive assistant 119 to check and auto-correct if any incorrect natural language message is received. Here, the autocorrection type may be either phonetic based if the natural language message is an audio message. Again, a typing based autocorrection may be used if the natural language message is a text input. The interactive assistant 119 validates the information only if a predefined validation criteria is met. For example, the validation criteria for the phone number may include total number of digits should be 10. Again, validation criteria for the email-id may include that the email-id may include any predecessor followed by @ and domain name.

Also, once, the one or more identified intents are matched, a structured natural language response is handled upon selection of the plurality of received natural language messages based on a personalisation criteria by an intent match post-processing subsystem 140. Here, a final structured response is generated based on a dynamic workflow which is determined. The final structured response is generated by the interactive assistant 119 to solve the natural language request or the natural language response cited by the user.

Further, the system 100 includes a learning and augmentation subsystem 150 which enables the interactive assistant 119 to augment an implementation of a conversational functionality to attain a predetermined performance level in the conversation. Here, the interactive assistant 119 improves the performance in every iteration by learning from historical data so that accurate results are provided in a shorter span of time.

Further, one or more real-time recommendations are provided by a recommendation subsystem 160 to at least one administrator associated with monitoring activity of the conversation process, wherein the at least one administrator includes the interactive assistant 119 associated with the conversation or a human live assistant associated with the conversation. The interactive assistant 119 also improves the performance by the one or more real-time recommendations provided by the human live agent. The one or more real-time recommendations helps the at least one administrator to improve the performance in real-time so that chances of generation of one or more errors may be reduced.

Figure 5:
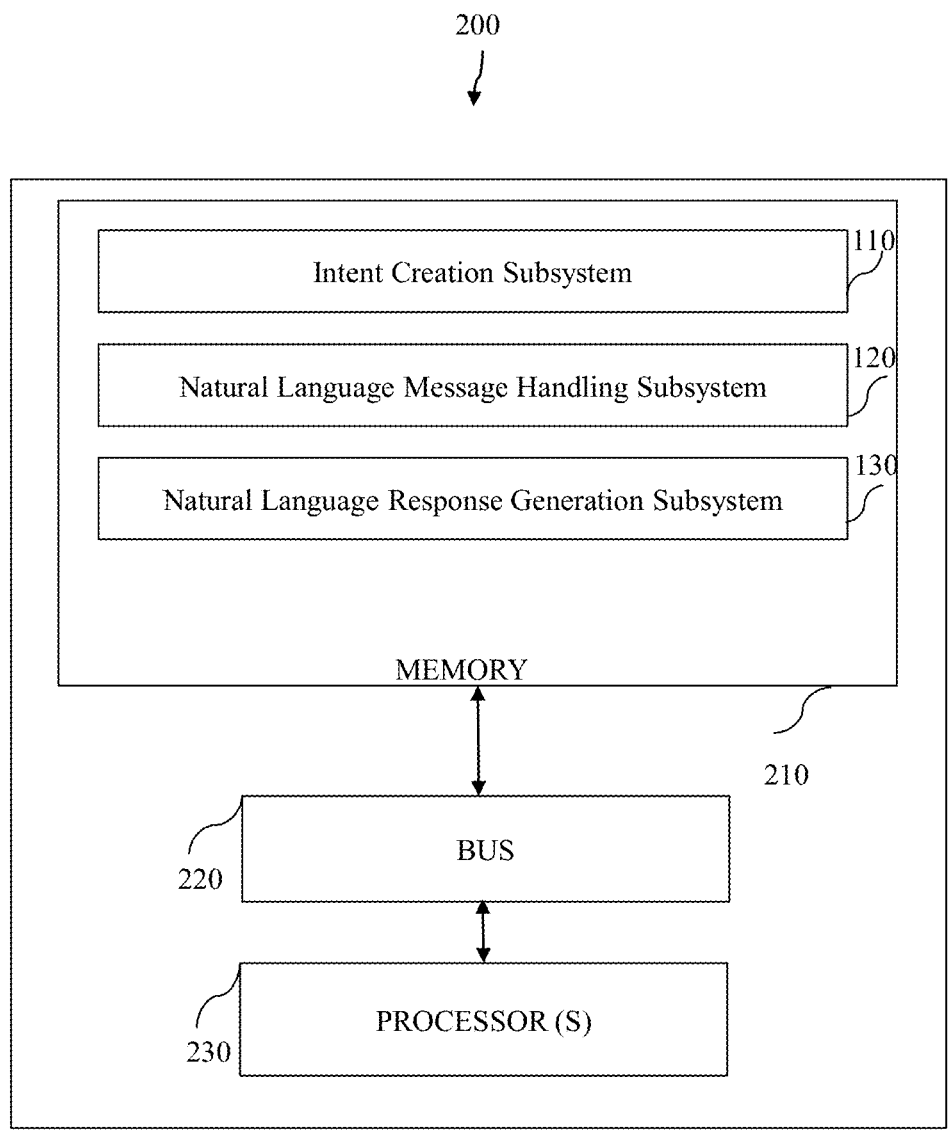
FIG. 5 is a block diagram of a computer or a server in accordance with an embodiment of the present disclosure.

FIG. 5 is a block diagram of a computer or a server in accordance with an embodiment of the present disclosure. The server 200 includes processors 230, and memory 210 operatively coupled to the bus 220.

The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of subsystems stored in the form of executable program which instructs the processor 230 to perform the method steps illustrated in FIG. 1. The memory 210 is substantially similar to the system 100 of FIG. 1. The memory 210 has following subsystems: an intent creation subsystem 110, a natural language message handling subsystem 120, a natural language response handling subsystem 130.

The intent creation subsystem 110 is configured to receive one or more predefined intents to create one or more corresponding intent databases. The natural language message handling subsystem 120 is configured to receive a plurality of natural language messages from a user to identify one or more intents associated with a plurality of received natural language messages. The natural language message handling subsystem 120 is configured to receive a plurality of natural language messages from a user to identify one or more intents associated with a plurality of received natural language messages. The natural language message handling subsystem 120 is also configured to handle the one or more identified intents by using a first message handling scheme when the one or more identified intents matches with the one or more predefined intents. Similarly, the natural language message handling subsystem 120 is also configured to handle the one or more identified intents by using a second message handling scheme when the one or more identified intents are unmatched with the one or more predefined intents. The natural language response handling subsystem 130 extract information from the plurality of received natural language messages, upon handling of the one or more identified intents, based on an information type and a validation criteria. The natural language response handling subsystem 130 is also configured to rectify the plurality of received natural language messages when an extraction of the information fails.

Figure 6:
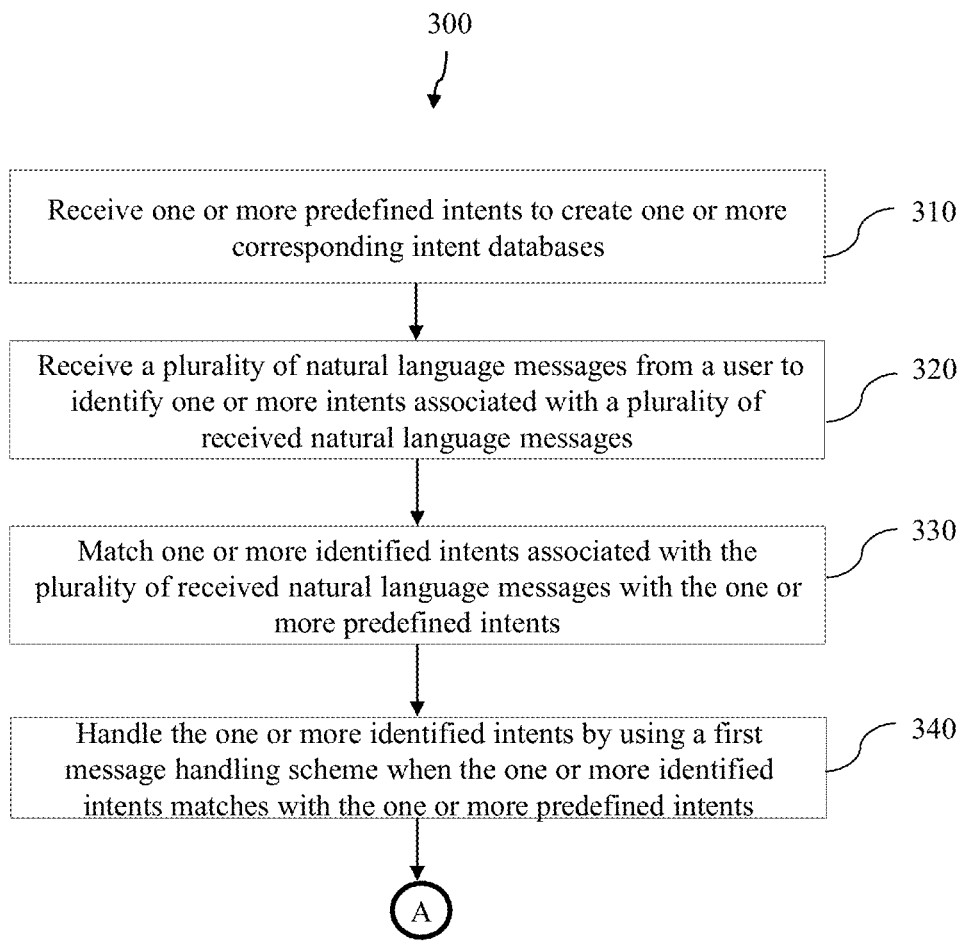
FIG. 6 (a) is a flow chart representing the steps involved in a method to interpret natural language requests and handle natural language responses in a conversation in accordance with the embodiment of the present disclosure.
Figure 6:
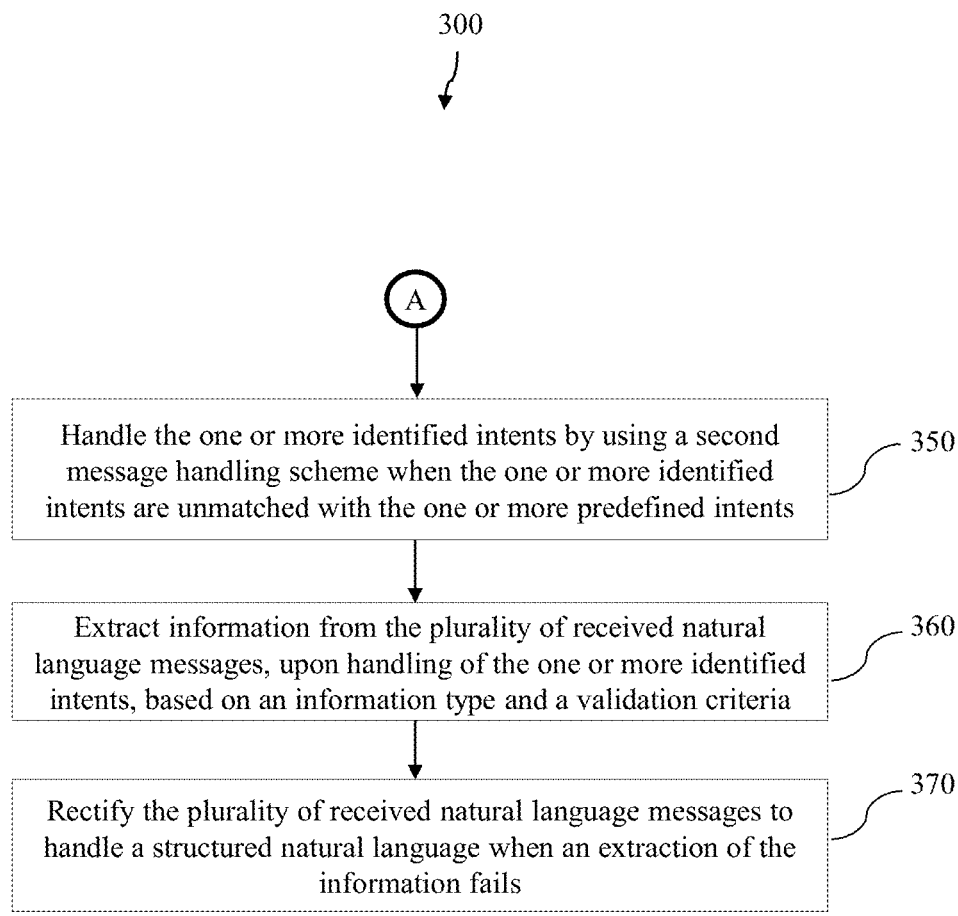

FIG. 6 (a) and FIG. 6 (b) is a flow chart representing the steps involved in a method 300 to interpret natural language requests and handle natural language responses in a conversation in accordance with the embodiment of the present disclosure. The method 300 includes receiving, by an intent creation subsystem, one or more predefined intents to create one or more corresponding intent databases in step 310. In one embodiment, receiving the one or more predefined intents to create the one or more corresponding databases may include receiving the one or more predefined intents for creating the one or more corresponding intent databases which may include at least one of an indexed intent database, a quick normalised intent database, an advanced normalised intent database, a vector representation of intent database, nearest neighbour vector indices database or a combination thereof.

The method 300 also includes receiving, by a natural language message handling subsystem, a plurality of natural language messages from a user to identify one or more intents associated with a plurality of received natural language messages in step 320. In one embodiment, receiving the plurality of natural language messages from the user to identify the one or more intents associated with the plurality of received natural language messages may include receiving the plurality of natural languages which may include at least one of a natural language user request, a natural language user response or a combination thereof. In such embodiment, the natural language user request may include at least one of a query, a demand, a command or a combination thereof. In some embodiment, the natural language user response may include a reply, or an answer given by the user.

In a specific embodiment, the method 300 further includes recognising, by an intent analysis subsystem, a language of the one or more predefined intents by using a linguistic analysis technique. In some embodiment, the method further includes categorising, by the intent analysis subsystem, one or more analysed intents into the one or more corresponding intent databases based on one or more criteria by using one or more classifiers. In such embodiment, categorising the one or more analysed intents into the one or more corresponding intent databases may include categorising the one or more analysed intents by using the one or more classifiers which may include at least one of a supervised learning machine (SVM), a convolutional neural network (CNN), a naïve Bayes classifier or a combination thereof.

The method 300 also includes matching, by a natural language message handling subsystem, one or more identified intents associated with the plurality of received natural language messages with the one or more predefined intents in step 330. In one embodiment, matching the one or more identified intents associated with the plurality of received natural language messages may include matching the one or more identified intents with the one or more predefined intents which are stored in the one or more corresponding intent databases upon creation and editing of the one or more predefined intents by an administrator associated with the interactive assistant. In some embodiment, matching the one or more identified intents may include matching the one or more identified intents which may include at least one of a state of the user, a location of the user, a time of the user, a purpose of the user or a combination thereof.

The method 300 also includes handling, by the natural language message handling subsystem, the one or more identified intents by using a first message handling scheme when the one or more identified intents matches with the one or more predefined intents in step 340. In one embodiment, handling the one or more identified intents may include handling the one or more identified intents by using a fast path processing technique when the one or more identified intents matches with the one or more predefined intents.

The method 300 also includes handling, by the natural language message handling subsystem, the one or more identified intents by using a second message handling scheme when the one or more identified intents are unmatched with the one or more predefined intents in step 350. In some embodiment, handling the one or more identified intents may include handling the one or more identified intents by using a slow path processing technique when the one or more identified intents are unmatched with the one or more predefined intents.

The method 300 also includes extracting, by a natural language response handling subsystem, information from the plurality of received natural language messages, upon handling of the one or more identified intents, based on an information type and a validation criteria in step 360. In one embodiment, extracting the information from the plurality of received natural language messages may include extracting the information based on the information type which may include a phone number of the user, a name of the user, an email-id of the user, an address of the user or a combination thereof. In another embodiment, extracting the information from the plurality of received natural language messages may include extracting the information based on the validation criteria which may include a set of predetermined rules corresponding to each of the information type.

The method 300 also includes rectifying, by the natural language response handling subsystem, the plurality of received natural language messages when an extraction of the information fails in step 370. In one embodiment, rectifying the plurality of natural language messages may include automatically correcting an incorrect natural language message received from the user by the interactive assistant or alerting the user for self-correction of the plurality of received natural language messages.

In one embodiment, the method 300 also includes generating, by an intent match post-processing subsystem, a structured natural language response upon selection of the plurality of received natural language messages based on a personalisation criteria. In one embodiment, generating the structured natural language response may include generating the structured natural language response based on an execution of a dynamically generated working procedure when a successful intent match is encountered. In one embodiment, the personalisation criteria may include one or more standards which differs depending upon at least one of the location of the user, a choice of the user, a personality of the user and the like.

In a specific embodiment, the method 300 further includes enabling, by a learning and augmentation subsystem, the interactive assistant to augment an implementation of a conversational functionality to attain a predetermined performance level in the conversation. In one embodiment, the learning and the augmentation subsystem utilises an artificial intelligence technique to optimise the performance of the interactive assistant. The interactive assistant learns from historical data and improves the performance in order to provide accurate and fast results for future data.

In a preferred embodiment, the method 300 further includes providing, by a recommendation subsystem, one or more real-time recommendations to at least one administrator associated with monitoring activity of the conversation process, wherein the at least one administrator includes the interactive assistant associated with the conversation, a human assistant associated with the conversation or a combination thereof.

Various embodiments of the present disclosure enable the interactive assistant to self-learn and self-optimize based on interactions with the user.

Moreover, the present disclosed system enables handling of both structured as well as unstructured natural language messages received from the user by using one or more message handling schemes.

Also, the present disclosed system has a slow path message handling scheme and a fast path message handling scheme and enables learning from user conversations to move processing of one or more intents to a fast path from a slow path to improve the system performance over time.

In addition to, the present disclosed system creates learning data from intents that it could not handle to improve the system over time.

Furthermore, the present disclosed system provides real-time suggestions to a human live assistant and helps in learning of the system from human interactions to improve the performance over time.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system to interpret natural language requests and handle natural language responses in a conversation comprising:
an intent creation subsystem configured to receive one or more predefined intents to create one or more corresponding intent databases;
an intent analysis subsystem operatively coupled to the intent creation subsystem, wherein the intent analysis subsystem is configured to:
recognise a language of the one or more predefined intents by using a linguistic analysis technique;
categorise one or more analysed intents into the one or more corresponding intent databases based on one or more criteria by using one or more classifiers wherein, the one or more classifiers comprise at least one of a supervised learning machine (SVM), a convolutional neural network (CNN), and a naïve Bayes classifier;
a natural language message handling subsystem operatively coupled to the intent creation subsystem, wherein the natural language message handling subsystem is configured to:
receive a plurality of natural language messages from a user to identify one or more intents associated with a plurality of received natural language messages;
match one or more identified intents associated with the plurality of received natural language messages with the one or more predefined intents;
handle the one or more identified intents by using a first message handling scheme when the one or more identified intents matches with the one or more predefined intents;
handle the one or more identified intents by using a second message handling scheme when the one or more identified intents are unmatched with the one or more predefined intents, wherein the second message handling scheme comprises computation of one or more complicated tasks, and wherein an advanced level of intent matching is performed;
a natural language response handling subsystem operatively coupled to the natural language message handling subsystem, wherein the natural language response handling subsystem is configured to:
extract information from the plurality of received natural language messages, upon handling of the one or more identified intents, based on an information type and a validation criteria; and
rectify the plurality of received natural language messages to handle a structured natural language response when an extraction of the information fails;
an intent match post-processing subsystem operatively coupled to the natural language response handling subsystem, wherein the intent match post-processing subsystem is configured to generate a structured natural language response upon selection of the plurality of received natural language messages based on a personalisation criteria, wherein the structured natural language response is generated based on an execution of a dynamically generated working procedure when a successful intent match is encountered, and wherein the personalisation criteria comprises one or more standards which differs depending upon at least one of a location of the user, a choice of the user, a personality of the user and the like;
a learning and the augmentation subsystem operatively coupled to the natural language message handling subsystem, the natural language response handling subsystem, and the intent match post-processing subsystem, wherein the learning and the augmentation subsystem is configured to:
utilise an artificial intelligence technique to provide one or more recommendations to at least one administrator associated with monitoring activity of the conversation process, to optimise the performance of the interactive assistant; and enable an interactive assistant to augment an implementation of a conversational functionality to attain a predetermined performance level in the conversation; and a recommendation subsystem operatively coupled to the learning and augmentation subsystem, wherein the recommendation subsystem is configured to provide one or more real-time recommendations to at least one administrator associated with monitoring activity of the conversation process, wherein the at least one administrator comprises the interactive assistant associated with the conversation, human assistant associated with the conversation or a combination thereof, wherein the interactive assistant is configured to improve a performance by the one or more real-time recommendations provided by at least one of: a human live agent, wherein the one or more real-time recommendations is configured to help the at least one administrator to improve the performance in real-time to reduce chances of generation of one or more errors.

2. The system as claimed in claim 1, wherein the one or more intent databases comprises at least one of an indexed intent database, a quick normalised intent database, an advanced normalised intent database, a vector representation of intent database, a text search database, nearest neighbour vector indices database or a combination thereof.

3. The system as claimed in claim 1, wherein the plurality of natural language messages comprises at least one of a natural language user request, a natural language user response or a combination thereof.

4. The system as claimed in claim 3, wherein the natural language user response comprises at least one of a state of the user, a location of the user, a time of the user, a purpose of the user or a combination thereof.

5. A method comprising:
receiving, by an intent creation subsystem, one or more predefined intents to create one or more corresponding intent databases;
recognising, by an intent analysis subsystem, a language of the one or more predefined intents by using a linguistic analysis technique;
categorising, by an intent analysis subsystem, one or more analysed intents into the one or more corresponding intent databases based on one or more criteria by using one or more classifiers wherein, the one or more classifiers comprise at least one of a supervised learning machine (SVM), a convolutional neural network (CNN), and a naïve Bayes classifier;
receiving, by a natural language message handling subsystem, a plurality of natural language messages from a user to identify one or more intents associated with a plurality of received natural language messages;
matching, by a natural language message handling subsystem, one or more identified intents associated with the plurality of received natural language messages with the one or more predefined intents;
handling, by the natural language message handling subsystem, the one or more identified intents by using a first message handling scheme when the one or more identified intents matches with the one or more predefined intents;
handling, by the natural language message handling subsystem, the one or more identified intents by using a second message handling scheme when the one or more identified intents are unmatched with the one or more predefined intents;

extracting, by a natural language response handling subsystem, information from the plurality of received natural language messages, upon handling of the one or more identified intents, based on an information type and a validation criteria; and
rectifying, by the natural language response handling subsystem, the plurality of received natural language messages to handle a structured natural language response when an extraction of the information fails;
generating, by an intent match post-processing subsystem, a structured natural language response upon selection of the plurality of received natural language messages based on a personalisation criteria;
generating, by the intent match post-processing subsystem, the structured natural language response comprise generating the structured natural language response based on an execution of a dynamically generated working procedure when a successful intent match is encountered, wherein the personalisation criteria comprises one or more standards which differs depending upon at least one of the location of the user, a choice of the user, a personality of the user and the like;
utilising, by a learning and the augmentation subsystem, an artificial intelligence technique to provide one or more recommendations to at least one administrator associated with monitoring activity of the conversation process, to optimise the performance of the interactive assistant;
enabling, by the learning and augmentation subsystem, an interactive assistant to augment an implementation of a conversational functionality to attain a predetermined performance level in the conversation; and
providing, by a recommendation subsystem, one or more real-time recommendations to at least one administrator associated with monitoring activity of the conversation process, wherein the at least one administrator comprises the interactive assistant associated with the conversation, a human assistant associated with the conversation or a combination thereof.

6. The method as claimed in claim 5, wherein handling the one or more identified intents by using the first message handling scheme comprises handling the one or more identified intents by:
identifying a structured form of the plurality of received natural language messages;
handling the structured natural language response when presence of the structured form of the plurality of received natural language messages is identified;
identifying an expectation of an occurrence of the structured natural language response when the plurality of received natural language user messages is a natural language response and an absence of the structured form is determined;
converting the natural language response into the structured natural response;
determining matching of the one or more identified intents of the structured natural response when a response mismatch is encountered upon conversion.

7. The method as claimed in claim 5, wherein handling the one or more identified intents by using the second message handling scheme comprises handling the one or more identified intents by:
identifying one or more entities in the plurality of received natural language messages to create the structured natural language response excluding the one or more entities and rectified natural language response based on an intent of an interactive assistant when the matching of the intent in the first condition generates an unsatisfied result;

determining matching of the one or more identified intents of the plurality of received natural language messages by using one or more approaches, wherein the one or more approaches comprises matching the one or more identified intents in the quick normalised intent database, matching the one or more identified intents in the nearest neighbour vector indices database and matching the one or more identified intents in the advanced normalised intent database;

identifying a requirement of an elaboration of the plurality of received natural language messages from the users when a failure in the matching of the one or more identified intents using the advanced normalised intent database is detected;

creating learning data and a failure handling path when the failure in the matching of the one or more identified intents using the one or more approaches is detected.

* * * * *